US012756242B1

(12) United States Patent
Lin et al.

(10) Patent No.: US 12,756,242 B1
(45) Date of Patent: Oct. 6, 2026

(54) WIRELESS POWER DEVICES WITH CONDUCTIVE SHIELDING STRUCTURES

(71) Applicant: Apple Inc., Cupertino, CA (US)

(72) Inventors: Ruiyang Lin, Milpitas, CA (US); Miranda L Daly, Redwood City, CA (US); Christopher J Walton, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 812 days.

(21) Appl. No.: 18/175,164

(22) Filed: Feb. 27, 2023

Related U.S. Application Data

(60) Provisional application No. 63/343,449, filed on May 18, 2022.

(51) Int. Cl.
*H02J 50/80* (2016.01)
*H02J 50/10* (2016.01)
*H02J 50/90* (2016.01)

(52) U.S. Cl.
CPC .............. *H02J 50/80* (2016.02); *H02J 50/10* (2016.02); *H02J 50/90* (2016.02)

(58) Field of Classification Search
CPC ............. H02J 50/80; H02J 50/90; H02J 50/10
See application file for complete search history.

(56) References Cited

U.S. PATENT DOCUMENTS

| | | | | |
|---|---|---|---|---|
| 8,896,264 | B2 * | 11/2014 | Partovi | H02J 7/00034 320/108 |
| 10,014,104 | B2 | 7/2018 | Widmer et al. | |
| 10,193,374 | B2 | 1/2019 | Kursula et al. | |
| 10,326,488 | B2 | 6/2019 | Wojcik | |
| 10,910,865 | B2 * | 2/2021 | Wambugu Ngahu | H02J 50/12 |
| 2021/0099030 | A1 * | 4/2021 | Walton | H02J 50/005 |
| 2021/0384754 | A1 * | 12/2021 | Xu | H01F 7/02 |

FOREIGN PATENT DOCUMENTS

| | | |
|---|---|---|
| KR | 102105079 B1 | 4/2020 |

* cited by examiner

*Primary Examiner* — Carlos Amaya
(74) *Attorney, Agent, or Firm* — Treyz Law Group, P.C.; Joseph F. Guihan

(57) ABSTRACT

A wireless power system has a wireless power transmitting device and a wireless power receiving device. The wireless power transmitting device may include a coil and wireless power transmitting circuitry coupled to the coil. The wireless power receiving device may include a coil that is configured to receive wireless power signals from the wireless power transmitting device and rectifier circuitry that is configured to convert the wireless power signals to direct current power. One or more shielding structures may be incorporated into the wireless power transmitting device. One or more shielding structures may be positioned over a magnetic alignment structure in the wireless power transmitting device, between a magnetic alignment structure and a magnetic core in the wireless power transmitting device, and/or on an interior surface of a plastic enclosure in the wireless power transmitting device.

10 Claims, 7 Drawing Sheets

WIRELESS POWER DEVICES WITH CONDUCTIVE SHIELDING STRUCTURES

This application claims the benefit of U.S. Provisional Patent Application No. 63/343,449, filed May 18, 2022, which is hereby incorporated by reference herein in its entirety.

FIELD

This relates generally to power systems, and, more particularly, to wireless power systems for charging electronic devices.

BACKGROUND

In a wireless charging system, a wireless power transmitting device transmits wireless power to a wireless power receiving device. The wireless power transmitting device uses a wireless power transmitting coil to transmit wireless power signals to the wireless power receiving device. The wireless power receiving device has a coil and rectifier circuitry. The coil of the wireless power receiving device receives alternating-current wireless power signals from the wireless power transmitting device. The rectifier circuitry converts the received signals into direct-current power.

SUMMARY

An electronic device may include a housing, a wireless charging coil in the housing, a ferrimagnetic core in the housing and overlapping the wireless charging coil, at least one magnetic alignment structure in the housing that at least partially surrounds a central region, the ferrimagnetic core and the wireless charging coil being positioned in the central region, and an annular conductive shielding structure in the housing that is interposed between the at least one magnetic alignment structure and the ferrimagnetic core.

An electronic device may include a housing having one or more non-metallic and non-magnetic interior surfaces, a wireless charging coil in the housing, a ferrimagnetic core in the housing and overlapping the wireless charging coil, at least one magnetic alignment structure in the housing that at least partially surrounds a central region, the ferrimagnetic core and the wireless charging coil being positioned in the central region, and a conductive shielding structure that is positioned on at least one of the one or more non-metallic and non-magnetic interior surfaces of the housing.

An electronic device may include a housing, a wireless charging coil in the housing, a ferrimagnetic core in the housing and overlapping the wireless charging coil, at least one magnetic alignment structure in the housing that at least partially surrounds a central region, the ferrimagnetic core and the wireless charging coil being positioned in the central region, and an annular conductive shielding structure in the housing that overlaps the at least one magnetic alignment structure.

DETAILED DESCRIPTION

A wireless power system includes a wireless power transmitting device. The wireless power transmitting device wirelessly transmits power to a wireless power receiving device. The wireless power transmitting device may be a charging puck, a charging mat, a portable electronic device with power transmitting capabilities, a removable battery case with power transmitting capabilities, or other power transmitter. The wireless power receiving device may be a device such as a cellular telephone, tablet computer, laptop computer, removable battery case, electronic device accessory, wearable such as a wristwatch, or other electronic equipment. The wireless power receiving device uses power from the wireless power transmitting device for powering the receiving device and for charging an internal battery.

Wireless power is transmitted from the wireless power transmitting device to the wireless power receiving device by using an inverter in the wireless power transmitting device to drive current through one or more wireless power transmitting coils. The wireless power receiving device has one or more wireless power receiving coils coupled to rectifier circuitry that converts received wireless power signals into direct-current power.

Measurement circuitry in the wireless power transmitting device may perform foreign object detection before commencing wireless power transfer to the wireless power receiving device. The foreign object detection performed by the measurement circuitry may account for metallic components that are included in the wireless power transmitting device and/or the wireless power receiving device. For example, the wireless power transmitting device may be placed on a metallic object such as a metallic table. However, the foreign object detection techniques used may not be able to determine whether the metallic component is intended and/or whether it will affect wireless power transfer between the wireless power transmitting device and the wireless power receiving device. Indeed, in some instances it would be beneficial for the wireless power transfer to proceed under varying usage conditions including the placement of the wireless power receiving device on a metallic table.

To improve foreign object detection operations, one or more shielding structures may be incorporated into the wireless power transmitting device. One or more shielding structures may be positioned over a magnetic alignment structure in the wireless power transmitting device, between a magnetic alignment structure and a magnetic core in the wireless power transmitting device, and/or on a non-metallic and non-magnetic surface of an enclosure in the wireless power transmitting device.

Figure 1:
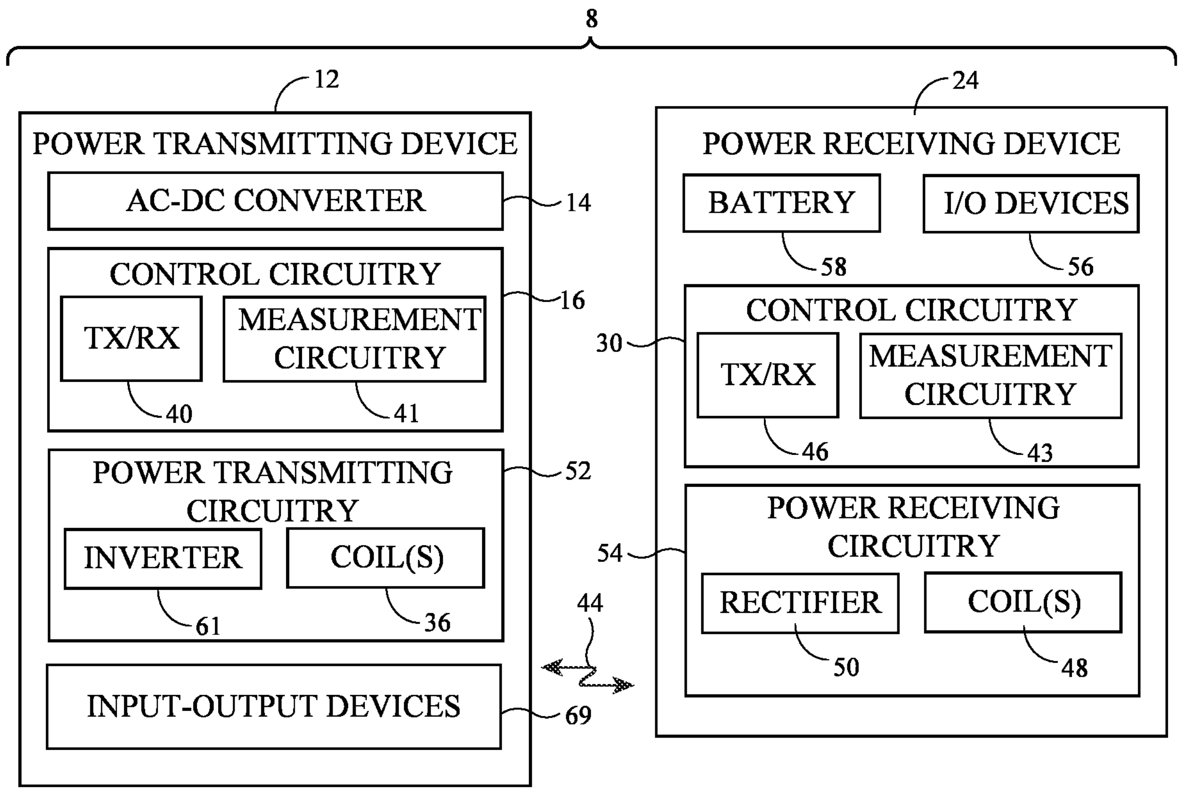
FIG. 1 is a schematic diagram of an illustrative wireless power system in accordance with various embodiments.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in processing user input, handling negotiations between devices 12 and 24, sending and receiving in-band and out-of-band data, making measurements, estimating power losses, determining power transmission levels, and otherwise controlling the operation of system 8.

Control circuitry in system 8 may be configured to perform operations in system 8 using hardware (e.g., dedicated hardware or circuitry), firmware and/or software. Software code for performing operations in system 8 and other data is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Power receiving device 24 may be a portable electronic device such as a cellular telephone, a laptop computer, a tablet computer, a wearable such as an earbud or wristwatch, a wirelessly charged removable battery case for an electronic device, or other electronic equipment. Power transmitting device 12 and/or power receiving device 24 may be capable of both transmitting and receiving wireless power. For example, a single coil in an electronic device may be operable in a power receiving mode (where power is received) or a power transmitting mode (where power is transmitted).

Power transmitting device 12 may be coupled to a wall outlet (e.g., an alternating-current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coil(s) 36. These coil drive signals cause coil(s) 36 to transmit wireless power. Multiple coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, portable electronic device such as a cellular telephone, etc.) may have only a single coil. In other arrangements, a wireless charging device may have multiple coils (e.g., two or more coils, 2-4 coils, 5-10 coils, at least 10 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. The AC signals that are used in transmitting wireless power may have any suitable frequency (e.g., 100-400 kHz, etc.). Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56. Input-output devices 56 may include input devices for gathering user input and/or making environmental measurements and may include output devices for providing a user with output. As an example, input-output devices 56 may include a display, speaker, camera, touch sensor, ambient light sensor, and other devices for gathering user input, making sensor measurements, and/or providing user with output. Device 12 may include input-output devices 69 (e.g., any of the input-output devices described in connection with input-output devices 56).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12. As another example, ASK modulation may be used to convey in-band data from power transmitting device 12 to power receiving device 24 and/or FSK modulation may be used to convey in-band data from power receiving device 24 to power transmitting device 12. In general, wireless power may simultaneously be conveyed between devices during in-band communications (using ASK or FSK).

Control circuitry 16 has measurement circuitry 41. Measurement circuitry 41 may include voltage measurement circuitry (e.g., for measuring one or more voltages in device 12 such as a coil voltage associated with a wireless power transmitting coil) and/or current measurement circuitry (e.g., for measuring on or more currents such as a wireless power transmitting coil current).

Circuitry 41 may be used to detect wireless power receiving devices 24 with at least one wireless power receiving coil that are capable of communicating with and/or receiving power from power transmitting device 12. Wireless power receiving devices with at least one wireless power receiving coil that are capable of communicating with and/or receiving power from power transmitting device 12 may sometimes be referred to as supported devices or compatible devices. Circuitry 41 may also detect unsupported or incompatible electronic devices (i.e., electronic devices that are not operable to wirelessly receive power from power transmitting device 12) and objects such as coins, keys, paper clips, and other metallic objects that may potentially be undesirably heated. For simplicity, incompatible electronic devices and other metallic objects such as coins, keys, and paper clips may all be referred to as foreign objects.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, control circuitry 16 uses the signal generator circuitry of signal measurement circuitry 41 to apply an excitation signal (sometimes referred to as an impulse signal or probe signal) to coil 36 while using the signal detection circuitry of signal measurement circuitry 41 to measure a corresponding response. The characteristics of coil 36 depend on whether any objects (e.g., a supported device and/or a foreign object) overlap the coil. Signal measurement circuitry 41 is configured to measure signals at the coil while supplying the coil with signals at one or more frequencies (to measure coil inductance), signal pulses (e.g., so that measurement circuitry in the measurement circuitry can be used to make inductance and Q factor measurements), etc. Using measurements from measurement circuitry 41, the wireless power transmitting device determines whether an external object (e.g., a supported device and/or a foreign object) is present on coil(s) 36.

If measurement circuitry 41 determines that a compatible device such as wireless power receiving device 24 is present without an interfering foreign object, wireless power transfer may commence between devices 12 and 24. If a foreign object is determined to be present on wireless power transmitting device 12 by measurement circuitry 41, wireless power transfer may be prevented (even though it is otherwise desirable to transmit wireless power to compatible device 24).

Control circuitry 30 has measurement circuitry 43. Measurement circuitry 43 may include voltage measurement circuitry (e.g., for measuring one or more voltages in device 24 such as a coil voltage associated with a wireless power transmitting coil and/or a rectifier output voltage) and/or current measurement circuitry (e.g., for measuring one or more currents such as wireless power receiving coil current and/or rectifier output current).

Figure 2:
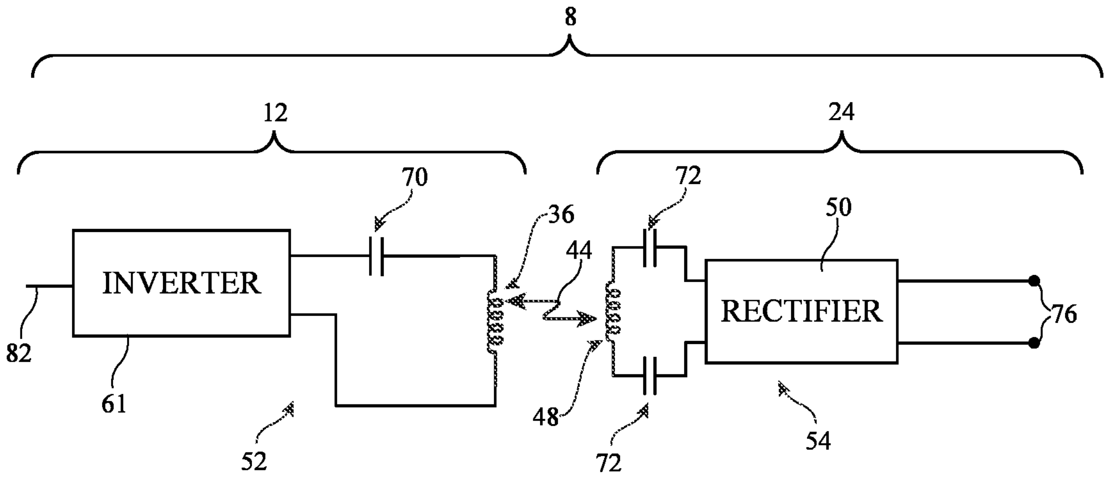
FIG. 2 is a circuit diagram of an illustrative wireless power system in accordance with various embodiments.

FIG. 2 shows illustrative wireless power circuitry in system 8 in an illustrative scenario in which a wireless power transmitting device has been paired with a wireless power receiving device. The wireless power circuitry of FIG. 2 includes wireless power transmitting circuitry 52 in wireless power transmitting device 12 and wireless power receiving circuitry 54 in wireless power receiving device 24. During operation, wireless power signals 44 are transmitted by wireless power transmitting circuitry 52 and are received by wireless power receiving circuitry 54. The configuration of FIG. 2 includes a single transmitting coil 36 and a single receiving coil 48 (as an example).

As shown in FIG. 2, wireless power transmitting circuitry 52 includes inverter circuitry 61. Inverter circuitry (inverter) 61 may be used to provide signals to coil 36. During wireless power transmission, the control circuitry of device 12 supplies signals to control input 82 of inverter 61 that cause inverter 61 to supply alternating-current drive signals to coil 36. Circuit components such as capacitor 70 may be coupled in series with coil 36 as shown in FIG. 2.

When alternating-current current signals are supplied to coil 36, corresponding alternating-current electromagnetic signals (wireless power signals 44) are transmitted to nearby coils such as illustrative coil 48 in wireless power receiving circuitry 54. This induces a corresponding alternating-current (AC) current signal in coil 48. Capacitors such as capacitors 72 may be coupled in series with coil 48. Rectifier 50 receives the AC current from coil 48 and produces corresponding direct-current power (e.g., direct-current voltage Vrect) at output terminals 76. This power may be used to power a load.

If desired, some of the devices in wireless power system 8 may have both the ability to transmit wireless power signals and to receive wireless power signals. A cellular telephone or other portable electronic device may, as an example, have a single coil that can be used to receive wireless power signals from a charging puck or other wireless power transmitting device and that can also be used to transmit wireless power to another wireless power device (e.g., another cellular telephone, an accessory device, etc.). A device that can both transmit and receive wireless power may have all of the components of wireless power transmitting device 12 and all the components of wireless power receiving device 24 (e.g., power transmitting circuitry 52 and power receiving circuitry 54 are included in a single device). However, the functionality of the wireless power transmission and the wireless power reception is the same as described in connection with FIGS. 1 and 2. Therefore, although the examples herein will focus on a scenario where a dedicated wireless power transmitting device transfers charge to a dedicated wireless power receiving device, it should be understood that a device that both transmits and receives wireless power may be substituted for one or both devices.

Figure 3A:
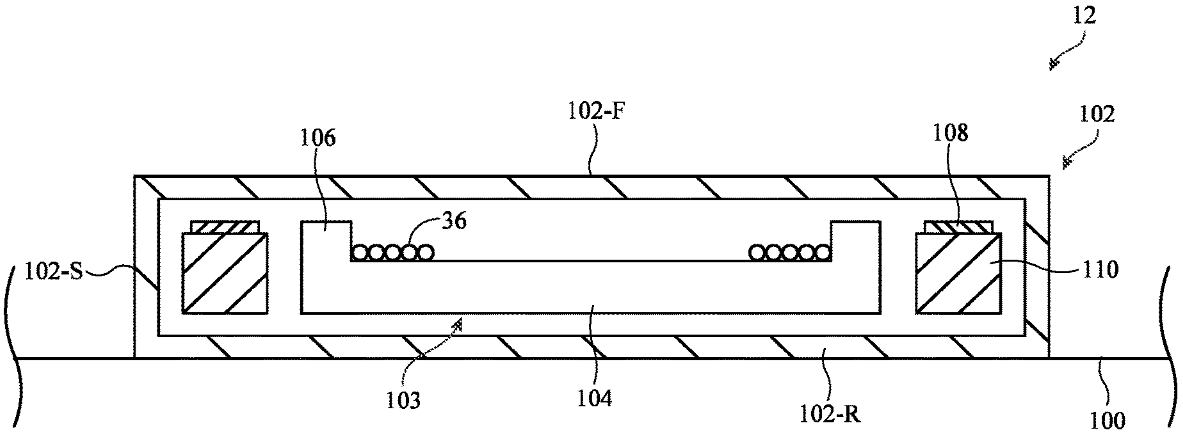
FIG. 3A is a side view of an illustrative wireless power transmitting device with a shielding structure that overlaps a magnetic alignment structure in accordance with an embodiment.

FIG. 3A is a side view of an illustrative wireless power transmitting device 12 that may be used in wireless power system 8. As shown, a power transmitting assembly (e.g., part of power transmitting circuitry 52) is included within wireless power transmitting device 12. The power transmitting assembly (sometimes referred to as an inductive power transmitting assembly) includes a magnetic core 103 having a base 104 and a limb 106. A coil 36 is positioned on the magnetic core. Limb 106 may have a ring-shape that is concentric with coil 36, as one example. The coil 36 may be positioned within an opening defined by ring-shaped (annular) limb 106. Coil 36 may be coupled to inverter circuitry (e.g., inverter 61 in FIGS. 1 and 2). The inverter circuitry can drive the coil 36 to generate magnetic flux. Coil 36 may be wound from a single-strand conductor, a multiple strand conductor having multiple wires connected in parallel, braided wire, Litz wire, a conductive ink or conductive trace such as multilayer tracks on a printed circuit board, or other conductive elements suitable for forming coils.

Alignment structures such as magnetic alignment structures may optionally be included in the wireless power system. As shown in FIG. 3A, wireless power transmitting device 12 may have magnetic alignment structures 110. Each magnetic alignment structure 110 in the wireless power transmitting device may magnetically couple with a corresponding magnetic alignment structure in a corresponding wireless power receiving device during wireless power transfer operations between the wireless power transmitting device and the wireless power receiving device. When wireless power transmitting device 12 is magnetically coupled to wireless power receiving device 24, coil 36 in wireless power transmitting device 12 may be aligned with a corresponding coil 48 in wireless power receiving device 24. Therefore, the magnetic alignment structures ensure proper alignment of the receiving coil relative to the transmitting coil. Magnetic alignment structures 110 may be permanent magnets (e.g., formed from hard magnetic materials that retain their magnetism over time) or other magnetic structures.

Magnetic alignment structures 110 may include a single magnet with a ring-shape that is concentric with coil 36. In other words, the magnet may have a central opening that includes magnetic core 103 and coil 36. In another example, a plurality of discrete permanent magnets may be arranged in a circular (annular) pattern (e.g., dotted lines forming a circle) around core 103 and coil 36. The discrete permanent magnets may have an arcuate arrangement. In general, magnetic alignment structures 110 may include any desired number of magnets (with any desired gaps between adjacent magnets) distributed around the periphery of magnetic core 103. Magnetic alignment structures 110 may be characterized as at least partially surrounding a central region with magnetic core 103 and coil 36 or simply as surrounding a central region with magnetic core 103 and coil 36. It should be understood that small gaps may be included between discrete permanent magnets within the magnetic alignment structures. In this case, the magnetic alignment structures may still be characterized as at least partially surrounding (or surrounding) a central region with magnetic core 103 and coil 36 even though there is less than 360 degrees of coverage around the magnetic core 103 and coil 36.

In general, the power transmitting assembly may have any desired design. In one possible arrangement, the magnetic core of the power transmitting assembly may have a pot-core design (e.g., an enclosure with a ring-shaped hollow portion that receives the coil). In yet another possible arrangement, the power transmitting assembly may include a winding on a bar-shaped ferrite. Any desired magnetic core and coil design may be used (e.g., a U-shaped core, a C-shaped core, an E-shaped core, a toroidal core, etc.).

In general, the power transmitting assembly may have only one coil, two coils, three coils, more than three coils, etc. Each coil may have any desired number of windings. Each assembly may optionally include a transverse coil (e.g., a coil extending along the magnetic core base between two magnetic core limbs). The precise geometry of the coils and magnetic cores in wireless power transmitting device 12 and wireless power receiving device 24 may be tailored to the specific design. Wireless power transmitting device 12 may be designed to cooperate specifically with wireless power receiving device 24. This is, however, merely illustrative. Wireless power transmitting device 12 may, in comes cases, not be specifically designed to cooperate with wireless power receiving device 24. In general, each device may have different coil arrangements, different (or no) magnetic elements (e.g., magnetic cores), different coil and magnetic element sizes, different coil and magnetic element shapes, and other different characteristics.

As shown in FIG. 3A, wireless power transmitting device 12 may include a housing 102 (sometimes referred to as enclosure 102 or case 102). Housing 102 may be formed of plastic, glass, ceramics, fiber composites, metal (e.g., stainless steel, aluminum, etc.), other suitable materials, or a combination of any two or more of these materials. Any or all of the components of wireless power transmitting device 12 may be enclosed by housing 102. Housing 102 has a front portion 102-F, a rear portion 102-R, and one or more sidewall portions 102-S. Wireless power transmitting device 12 may be configured to transmit wireless power signals (e.g., signals 44 in FIGS. 1 and 2) through front portion 102-F to a wireless power receiving device 24 during wireless power transfer operations. Accordingly, front portion 102-F may be formed from a non-metal material so as to not disrupt the wireless power transfer operations. Front portion 102-F need not necessarily be formed exclusively from a non-metal material. The front portion 102-F may include a metal portion and a non-metal portion, with the size and position of the metal portion selected so as to not disrupt the wireless power transfer operations. Sidewall portions 102-S and rear portion 102-R may be formed from metal and/or non-metal materials.

As discussed above in connection with FIG. 1, wireless power transmitting device 12 includes measurement circuitry 41 that is configured to determine whether a foreign object is present. The foreign object detection performed by measurement circuitry 41 may account for metallic components (e.g., magnetic alignment structures 110, a printed circuit board, a battery) that are included in wireless power transmitting device 12 and/or wireless power receiving device 24. However, in some situations, wireless power transmitting device 12 may be placed on a metallic object such as metallic object 100 in FIG. 3A. Metallic object 100 may be, for example, a metallic table or other metallic furniture. The metallic object 100 may be formed from aluminum, stainless steel, or another metal material. The depiction of metallic object 100 in FIG. 3A as having a flat surface is merely illustrative. In some cases, metallic object 100 may surround wireless power transmitting device 12 on two or more sides (e.g., in scenarios where metallic object 100 is furniture in which the wireless power transmitting device is embedded).

Metallic object 100 may not adversely impact wireless power transfer between wireless power transmitting device 12 and wireless power receiving device 24. Therefore, it is desirable for wireless power transfer operations between wireless power transmitting device 12 and wireless power receiving device 24 to proceed normally even when wireless power transmitting device 12 is placed on metallic object 100. However, metallic object 100 may impact foreign object detection operations performed by measurement circuitry 41 in wireless power transmitting device 12. The presence of metallic object 100 may undesirably lead to false positives (e.g., foregoing wireless power transfer due to a detected foreign object even though no foreign object is present) and/or false negatives (e.g., performing wireless power transfer even though a foreign object is present) during foreign object detection operations performed by device 12.

To prevent metallic objects such as metallic object 100 from interfering with foreign object detection operations, one or more shielding structures may be incorporated into wireless power transmitting device 12. As shown in FIG. 3A, shielding structure 108 (sometimes referred to as conductive shielding structure 108, magnetic flux shielding structure 108, etc.) is included in wireless power transmitting device 12. Shielding structure 108 may be formed from a metallic material such as copper, aluminum, etc. Shielding structure 108 may be positioned to intercept magnetic flux produced by coil 36 before the magnetic flux interacts with metallic object 100. In this way, foreign object detection operations are consistent both with and without the presence of metallic object 100.

In FIG. 3A, shielding structure 108 is formed from a conductive tape (e.g., formed from a metal material such as copper, aluminum, etc.) that is applied to an upper surface of magnetic alignment structure(s) 110. The example of forming the shielding structure from an adhesive layer (e.g., conductive tape) is merely illustrative. In another possible arrangement, a non-conductive adhesive layer may be interposed between magnetic alignment structure(s) 110 and shielding structure 108. In the embodiment where shielding structure 108 is formed from conductive tape, the conductive tape may be applied directly to an upper surface of a permanent magnet in magnetic alignment structure(s) 110. Alternatively, magnetic alignment structure(s) 110 may include a plastic enclosure that houses one or more permanent magnets. In this case, the conductive tape may be applied to an upper surface of the plastic enclosure for the permanent magnets.

Figure 3B:
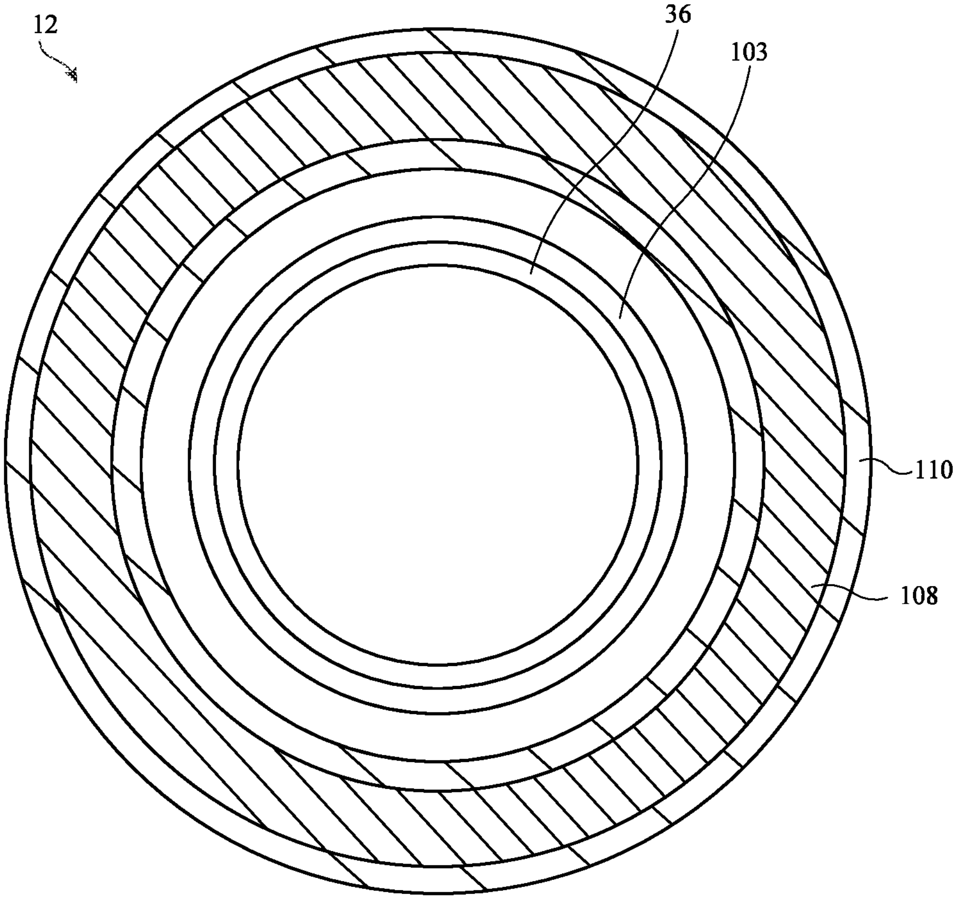
FIG. 3B is a top view of the illustrative wireless power transmitting device of FIG. 3A in accordance with an embodiment.

FIG. 3B is a top view of the wireless power transmitting device 12 of FIG. 3A. As shown in FIG. 3B, coil 36 has a ring-shape and magnetic core 103 has a circular footprint that is concentric with coil 36. Magnetic alignment structure (s) 110 has a ring-shape that is concentric with coil 36 and magnetic core 103. Shielding structure 108 has a ring-shaped (annular) footprint that overlaps (and is concentric with) the footprint of magnetic alignment structure(s) 110. Shielding structure 108 is also concentric with coil 36 and magnetic core 103. Annular structures (e.g., shielding structure 108 and magnetic alignment structures 110) may be characterized as concentric with other structures even when the annular structures have one or more gaps (e.g., between discrete permanent magnets in magnetic alignment structures 110).

In FIGS. 3A and 3B, shielding structure 108 is not electrically connected to a ground structure. In other words, shielding structure 108 is floating. This example is merely illustrative and shielding structure 108 may alternatively be electrically connected to ground if desired.

The example in FIGS. 3A and 3B of shielding structure 108 being formed over magnetic alignment structure(s) 110 is merely illustrative. In an alternate arrangement, shown in FIG. 4A, shielding structure 108 is interposed between magnetic core 103 (e.g., limb 106 of core 103) and magnetic alignment structure(s) 110. Similar to as in FIG. 3A, the shielding structure in FIG. 4A intercepts magnetic flux produced by coil 36 before the magnetic flux interacts with metallic object 100. In this way, foreign object detection operations are consistent both with and without the presence of metallic object 100.

Figure 4A:
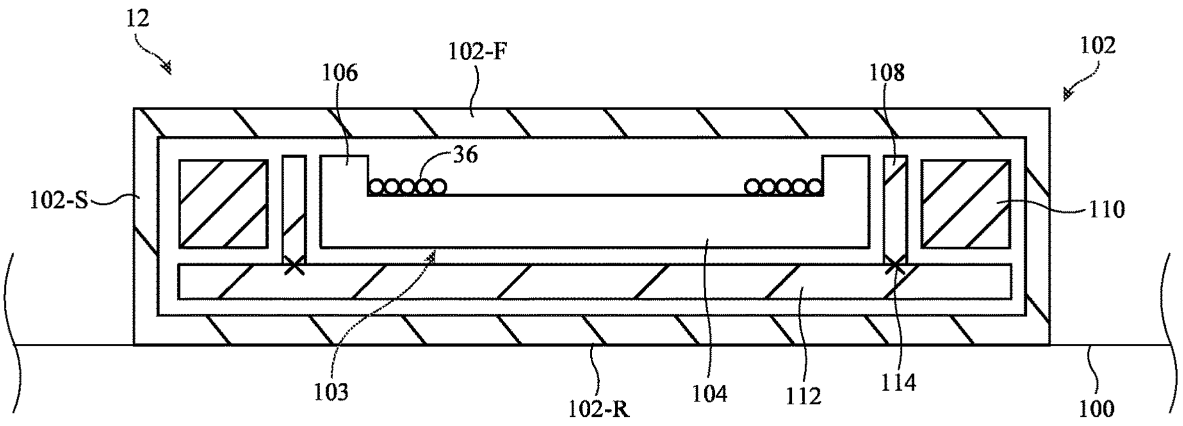
FIG. 4A is a side view of an illustrative wireless power transmitting device with a shielding structure that is interposed between a magnetic alignment structure and a magnetic core in accordance with an embodiment.

Shielding structure 108 in FIG. 4A may be formed from aluminum or another desired metal material. The shielding structure in FIG. 4A may sometimes be referred to as a fence. The fence may have a width and a height that is greater than the width (e.g., at least two times greater than the width, at least four times greater than the width, etc.). This example is merely illustrative. In general, the dimensions of shielding structure 108 may be selected to fit available interior space within device 12. In FIG. 4A, shielding structure 108 is in conductive contact with a metal midplate 112 within wireless power transmitting device 12. Metal midplate 112 is interposed between rear portion 102-R of housing 102 and magnetic core 103. Metal midplate 112 may provide structural integrity for one or more internal components of wireless power transmitting device 12. Metal midplate 112 may also serve as part of ground for wireless power transmitting device 12. Therefore, in FIG. 4A (unlike in FIG. 3A), shielding structure 108 is grounded (via the conductive contact to midplate 112). When shielding structure 108 is attached to metal midplate 112 as in FIG. 4A, the shielding structure may be characterized as a protrusion that protrudes from metal midplate 112 (e.g., towards a front portion 102-F of the housing that forms a charging surface for the wireless power transmitting device).

In FIG. 4A, shielding structure 108 is in conductive contact with midplate 112 through one or more welds 114. This example is merely illustrative. In general, shielding structure 108 may be attached to midplate 112 or any other components within wireless power transmitting device 12 using any desired techniques.

The example of FIG. 4A of the shielding structure being electrically connected to a ground structure is merely illustrative. In another desired embodiment, shielding structure 108 in FIG. 4A may be floating (e.g., as discussed in connection with FIG. 3A). As additional examples of a floating shielding structure between magnetic alignment structure(s) 110 and magnetic core 103, shielding structure 108 may be formed from conductive tape that is attached to a side surface of magnetic alignment structure(s) 110, may be formed from conductive tape that is attached to a side surface of magnetic core 103, may be formed from a metal structure (fence) that is attached to an underlying non-conductive structure, etc.

Figure 4B:
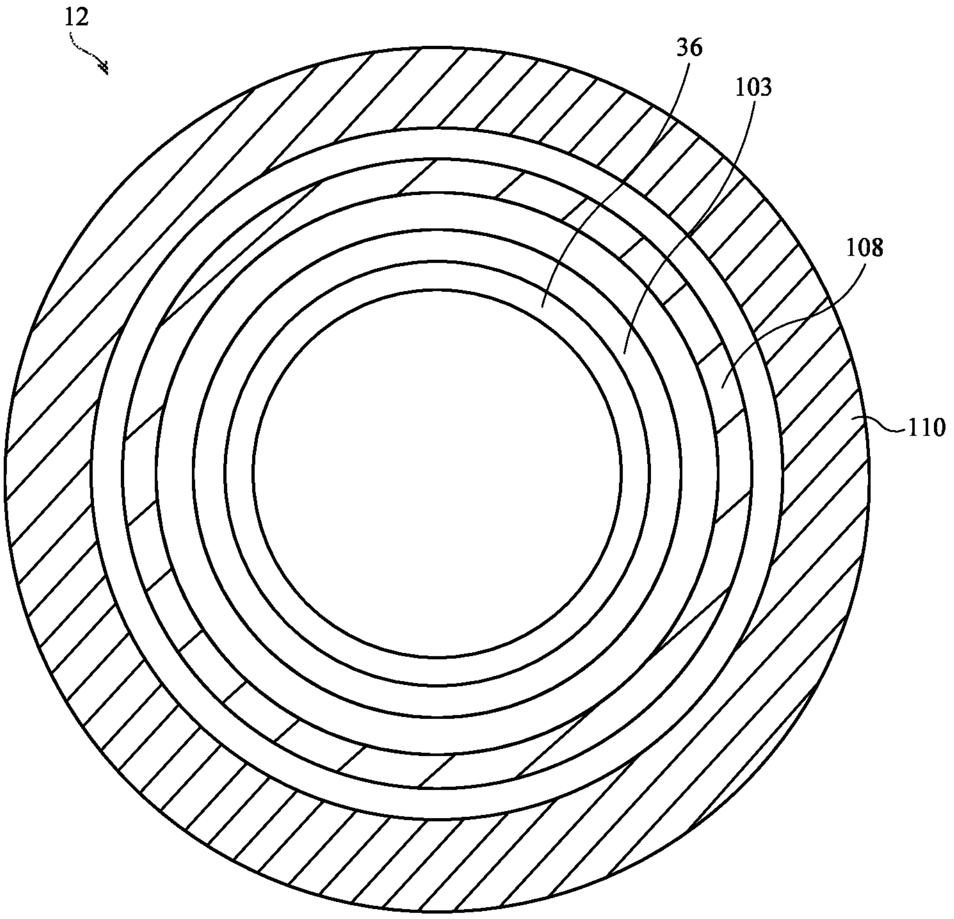
FIG. 4B is a top view of the illustrative wireless power transmitting device of FIG. 3A in accordance with an embodiment.

FIG. 4B is a top view of the wireless power transmitting device 12 of FIG. 4A. As shown in FIG. 4B, coil 36 has a ring-shape and magnetic core 103 has a circular footprint that is concentric with coil 36. Magnetic alignment structure (s) 110 has a ring-shape that is concentric with coil 36 and magnetic core 103. Shielding structure 108 has a ring-shaped footprint that is interposed between the footprints of magnetic alignment structure(s) 110 and magnetic core 103.

Shielding structure 108 is concentric with coil 36, magnetic core 103, and magnetic alignment structure(s) 110.

Figure 5:
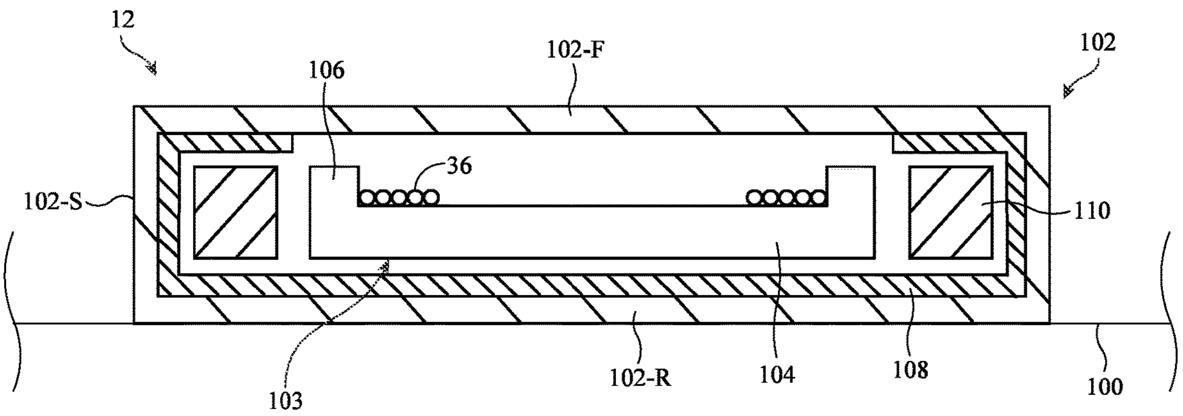
FIG. 5 is a side view of an illustrative wireless power transmitting device with a shielding structure that is positioned on an interior surface of a plastic housing in accordance with an embodiment.

In yet another possible arrangement, shown in FIG. 5, shielding structure 108 is formed as a metallic layer (e.g., a coating) on one or more non-metallic and non-magnetic (e.g., plastic) interior surfaces of enclosure 102. Housing 102 has one or more non-metallic and non-magnetic interior surfaces. For example, housing 102 may be formed from one or more plastic and/or glass portions that define one or more non-metallic and non-magnetic interior surfaces. In the example of FIG. 5, housing 102 may be formed from plastic and all of the interior surfaces of the housing are non-metallic and non-magnetic interior surfaces.

The shielding structure 108 may be coated directly on one or more non-metallic and non-magnetic interior surface(s) of enclosure 102 or may be attached to one or more non-metallic and non-magnetic interior surface(s) of enclosure 102 with adhesive. As yet another example, the shielding structure 108 may be a stand-alone structure that is not attached to enclosure 102. Similar to as in FIGS. 3A and 4A, the shielding structure in FIG. 5 intercepts magnetic flux produced by coil 36 before the magnetic flux interacts with metallic object 100. In this way, foreign object detection operations are consistent both with and without the presence of metallic object 100.

In FIG. 5, shielding structure 108 is not electrically connected to a ground structure. In other words, shielding structure 108 is floating. This example is merely illustrative and shielding structure 108 may alternatively be electrically connected to ground if desired.

Shielding structure 108 is shown as coating all of the interior surfaces of sidewall portion 102-S of housing 102, the entire interior surface of rear portion 102-R of housing 102, and some of the interior surface of front portion 102-F of housing 102 (e.g., the shielding structure 108 on front portion 102-F extends over the magnetic alignment structure 110 but not over magnetic core 103 in FIG. 5). This example is merely illustrative. The shielding structure 108 may be omitted in one or more additional portions of the housing if desired. For example, only the edges (e.g., in a ring-shape) of rear portion 102-R may include shielding structure 108 (similar to front portion 102-F), the shielding structure may be omitted from sidewall portion 102-S, etc.

In each one of the arrangements of FIGS. 3-5, the presence of shielding structure 108 does not impact the exterior appearance of wireless power transmitting device 12. This is useful in instances where wireless power transmitting device 12 has a target design for enclosure 102 that does not include shielding structures. With the arrangements of FIGS. 3-5, any desired enclosure design may be used for enclosure 102 while still achieving satisfactory shielding using shielding structure 108. For example, enclosure 102 may be formed entirely from plastic. The shielding structures of FIGS. 3-5 may be included in enclosure 102 to provide adequate shielding without impacting the exterior appearance of the plastic enclosure.

The magnetic cores in FIGS. 3-5 (e.g., magnetic core 103) may be formed from a soft magnetic material such as ferrite. The magnetic cores may have a high magnetic permeability, allowing them to guide the magnetic fields in the system. The example of using ferrite cores is merely illustrative. Other ferromagnetic and/or ferrimagnetic materials such as iron, mild steel, mu-metal (a nickel-iron alloy), a nanocrystalline magnetic material, rare earth metals, or other magnetic materials having a sufficiently high magnetic permeability to guide magnetic fields in the system may be used for one or more of the cores if desired. The magnetic cores may sometimes be referred to as ferrimagnetic cores. Magnetic core 103 may be a single piece or made from separate pieces. The cores may be molded, sintered, formed from laminations, formed from particles (e.g., ceramic particles) distributed in a polymer, or manufactured by other processes.

It should be noted that any two (or all three) of the shielding structure depicted in FIG. 3A (overlapping magnetic alignment structure 110), the shielding structure depicted in FIG. 4A (interposed between magnetic alignment structure 110 and magnetic core 103), and the shielding structure depicted in FIG. 5 (on a non-metallic and non-magnetic interior surface of the enclosure) may be included in a single wireless power transmitting device if desired. One or more of these types of shielding structures may also be used in wireless power receiving devices if desired (with similar arrangements as in FIGS. 3-5 except for the coil is a power receiving coil instead of a power transmitting coil).

The foregoing is merely illustrative and various modifications can be made to the described embodiments. The foregoing embodiments may be implemented individually or in any combination.

What is claimed is:

1. An electronic device comprising:
- a housing;
- a wireless charging coil in the housing;
- a ferrimagnetic core in the housing, wherein the ferrimagnetic core overlaps the wireless charging coil;
- at least one magnetic alignment structure in the housing that at least partially surrounds a central region, wherein the ferrimagnetic core and the wireless charging coil are positioned in the central region;
- an annular conductive shield interposed between the at least one magnetic alignment structure and the ferrimagnetic core; and
- a metal plate interposed between the ferrimagnetic core and the housing, wherein the annular conductive shield is in conductive contact with the metal plate.

2. The electronic device of claim 1, wherein the annular conductive shield structure is welded to the metal plate.

3. The electronic device of claim 1, wherein the annular conductive shield comprises a metal protrusion that protrudes from the metal plate.

4. The electronic device of claim 1, wherein the at least one magnetic alignment structure comprises a plurality of discrete permanent magnets arranged in an annular pattern.

5. The electronic device of claim 1, wherein the annular conductive shield is concentric with the at least one magnetic alignment structure.

6. The electronic device of claim 5, wherein the annular conductive shield is concentric with the wireless charging coil.

7. An electronic device comprising:
- a housing having one or more non-metallic and non-magnetic interior surfaces;
- a wireless charging coil in the housing;
- a ferrimagnetic core in the housing, wherein the ferrimagnetic core overlaps the wireless charging coil;
- at least one magnetic alignment structure in the housing that at least partially surrounds a central region, wherein the ferrimagnetic core and the wireless charging coil are positioned in the central region; and
- a conductive shielding structure that is positioned on at least one of the one or more non-metallic and non-magnetic interior surfaces of the housing, wherein the conductive shielding structure comprises a coating on the at least one of the one or more non-metallic and non-magnetic interior surfaces of the housing.

8. The electronic device defined in claim 7, wherein the conductive shielding structure comprises metal.

9. The electronic device defined in claim 7, wherein the housing has a front portion with a first non-metallic and non-magnetic interior surface, wherein the wireless charging coil is configured to transmit wireless power signals through the front portion, wherein a first portion of the conductive shielding structure is positioned on the first non-metallic and non-magnetic interior surface, and wherein the first portion of the conductive shielding structure overlaps the at least one magnetic alignment structure but not the ferrimagnetic core.

10. The electronic device defined in claim 9, wherein the housing has a side portion, wherein the at least one magnetic alignment structure is interposed between the side portion and the ferrimagnetic core, and wherein the conductive shielding structure has a second portion that is positioned on a second non-metallic and non-magnetic interior surface of the side portion.

* * * * *